Patented Sept. 14, 1948

2,449,193

UNITED STATES PATENT OFFICE 2,449,193

PROCESS AND CULTURE MEDIUM FOR PRODUCING PENICILLIN

Otto K. Behrens, Reuben G. Jones, and Quentin F. Soper, Indianapolis, Ind., assignors to Eli Lilly and Company, Indianapolis, Ind., a corporation of Indiana No Drawing. Application August 24, 1945, Serial No. 612,530

7 Claims. (Cl. 195—36)

This invention relates to penicillin and more particularly to improvements in the production thereof.

An object of this invention is to provide a process whereby the production and yield of penicillin may be improved. Other objects will be apparent from the disclosures herein made.

Penicillin, a material produced by a Penicillium mold of the notatum-chrysogenum group, has become widely known within recent years for its remarkable therapeutic properties as an antibacterial agent.

The availability of penicillin has been retarded by the circumstances of its production. The penicillin formed, presumably as a metabolic product, by the growth of the mold under suitable conditions, has been produced slowly and in very small quantity. Furthermore, the mold has produced other products, chemically similar to penicillin, but without potent antibacterial properties. Thus the small quantity of penicillin and the presence of structurally similar compounds have rendered its isolation difficult.

One of the methods which has been employed commercially for the production of penicillin is that known as surface culture. In a common adaptation of this method a liquid nutrient medium is supplied to a large number of bottles which are supported in a substantially horizontal position. The nutrient medium is then inoculated with the Penicillium mold and the mold grows on the surface of the nutrient medium. In order to produce commercial quantities of penicillin by this method a large number of bottles is required and individual handling is necessary.

Another process which has been commercialized to some extent is that known as the bran process wherein Penicillium mold is grown on bran. The bran may be spread in thin layers on trays or may be agitated continuously in rotating drums. While the bran itself is a nutrient for the growth of the mold, it is common to associate additional nutrient materials therewith.

Probably the most widely used process at the present time for the production of penicillin is that ordinarily referred to as submerged or deep culture. The submerged culture process involves the growth of Penicillium mold in an aqueous nutrient medium and accompanied customarily by agitation. When the submerged culture process is carried out in small vessels such as flasks of relatively small capacity, the process is frequently referred to as the "shake" culture process because the agitation is brought about by continuously shaking the culture by suitable mechanical means. When containers of larger capacity are employed, and such containers may have capacities running into the thousands of gallons, the agitation of the liquid nutrient medium is ordinarily accomplished in part by mechanical stirring and in part by aeration, which latter functions primarily to supply oxygen for the growth of the mold.

All of the above processes have been characterized in general by the slow production, and low yield, of penicillin.

By our invention the production of penicillin by a Penicillium mold of the notatum-chrysogenum group may be accelerated and the yield of penicillin increased.

According to the present invention penicillin is produced by growing a Penicillium mold of the notatum-chrysogenum group in a culture medium in the presence of the phenylacetyl compound, N-(2,2-diethoxyethyl)-phenylacetamide which may be represented by the formula

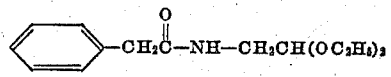

According to a preferred method the Penicillium mold and the phenylacetyl compound as represented above are associated with an aqueous culture medium containing nutrient material suitable for the growth and development of the mold, and the mold is grown under penicillin-producing conditions. The compound is incorporated in the nutrient medium in effective amount less than about 1 percent and preferably less than about 0.3 percent. The amount of material which accelerates the production of penicillin may accordingly be present in relatively small amount although over a substantial range. For example, the method may be effectively carried out by associating about 0.02 percent of N-(2,2-diethoxyethyl)-phenylacetamide and the Penicillium mold with a culture medium containing mold-growth-supporting material, and under similar conditions there may be satisfactorily employed both larger and smaller amounts of N-(2,2-diethoxyethyl)-phenylacetamide.

In another aspect there is provided by this invention, the culture medium comprising the mold-growth-supporting material and N-(2,2-diethoxyethyl)-phenylacetamide as described. In a preferred form the culture medium may comprise water, mold-growth-supporting material, and in amount effective to accelerate the production of penicillin and less than about 1 percent and preferably less than about 0.3 percent, a phenylacetyl compound as described. The amount of the compound which accelerates the production of penicillin may vary substantially throughout the range indicated above. By way of example, the culture medium may contain about 0.02 percent of N-(2,2-diethoxyethyl)-phenylacetamide.

This invention will now be described in detail in its present preferred application to the submerged culture process of producing penicillin.

In the submerged culture process, the culture medium comprises water and mold-growth-supporting material. The nutrient material may consist of ingredients known to those skilled in the art. A prominent constituent of one type of suitable nutrient material is that known as corn steep solids which is a by-product in the manufacture of corn starch. Corn steep solids is a desirable material because of its low cost and its effectiveness in bringing about a relatively high yield of penicillin. On the other hand corn steep solids is of indeterminate chemical composition, some ingredients of which may make more difficult the isolation of the penicillin produced during the growth of the mold. With a major constituent such as corn steep solids there are ordinarily associated additional ingredients known to the art such as corn sugar, lactose, and salts such as calcium carbonate and zinc sulfate. The exact function of the various ingredients is not known in detail, but it is known to those skilled in the art that the combination of such ingredients does bring about the production of penicillin when a Penicillium mold of the notatum-chrysogenum group is grown in such a culture medium under suitable conditions.

Another type of aqueous culture medium includes water and nutrient substances which, as contrasted with corn steep solids, are of a determinate chemical composition. Such ingredients include lactose, dextrose, acetic acid and salts such as sodium nitrate, ammonium nitrate, potassium dihydrogen phosphate, and magnesium sulfate. Compositions of this type are advantageous in that penicillin frequently is more readily separated from the other constituents of the culture medium and other products of the growth of the mold.

The mold employed for the production of penicillin is a Penicillium mold of the notatum-chrysogenum group, and illustratively a strain of this mold suitable for the purposes of this invention is that known as strain N. R. R. L. 1976.

The amount of N-(2,2-diethoxyethyl)-phenylacetamide employed in carrying out the invention may vary to a substantial extent. The effective amount ranges up to about 10 g. per liter of culture medium, or in other words, up to about 1 percent on a weight-volume basis, although it is preferred to employ the phenylacetyl compound in an amount less than about 0.3 percent.

The present optimum range when using, for example N-(2,2-diethoxyethyl)-phenylacetamide is about 0.02 percent. In general there is no particular advantage to be gained by employing an amount of the phenylacetyl compound in substantial excess of the amount effective in promoting the maximum production of penicillin by the mold.

The phenylacetyl compound may be associated with the mold and culture medium at any suitable time. Thus the materials of the culture medium upon association in a suitable container may be inoculated with the Penicillium mold, and the phenylacetyl compound may be incorporated either before or shortly after the inoculation with the mold.

The culture medium, with the mold, and the compound accelerating the production of penicillin, should be maintained at a suitable temperature, for example in the range of 20–30° C. A range of temperature which has been found to be particularly suitable is from 24–28° C. The period of time during which the mold is grown will depend upon the objective desired. Thus the mold may be grown only during the period of its maximum rate of growth. Under such conditions the mold growth may be interrupted after a period of growth of from two to three days. On the other hand the mold may be grown to obtain the maximum yield of penicillin. In such case the mold may be grown for a longer period, for example, for about four or five days.

The penicillin may be separated from the culture medium in any suitable manner. For example the penicillin may be adsorbed on a surface-active carbon. Alternatively the penicillin may be extracted by means of a suitable water-immiscible organic solvent such as amyl acetate. By well-known extractive procedures, the penicillin subsequently may be isolated in dry form as a salt thereof, for example the sodium or calcium salt.

By the practice of this invention the yield of penicillin has been substantially increased. Thus under comparative conditions the yield of penicillin has been increased upwards of 20 percent. This range is of course illustrative and lesser or greater yields are within the contemplation of the invention depending upon the conditions under which the penicillin is produced.

Specific examples illustrating the invention particularly with respect to the deep culture process of producing penicillin are given below.

*Example 1*

A culture medium was prepared as follows:

| | | |
|---|---|---|
| Lactose | g | 35 |
| Corn steep solids | g | 20 |
| Zinc sulfate heptahydrate | g | 0.004 |
| M/50 phosphate buffer | cc | 5 |
| Water, q. s. | cc | 1,000 |

To the above culture medium were added 0.2 g. of N-(2,2-diethoxyethyl)-phenylacetamide, namely 0.02 per cent on a weight-volume basis. The culture medium was inoculated with a Penicillium mold, strain N. R. R. L. 1976, and the mold was allowed to grow for 4 days at 27° C. The penicillin produced in the above culture medium amounted to 107 Oxford units per cc. of culture medium.

By way of comparison a Penicillium mold of the same strain grown in the same culture medium under the same conditions including time and temperature as above except in the absence of the N-(2,2-diethoxyethyl)-phenylacetamide, produced penicillin to the extent of only 98 Oxford units per cc. of culture medium.

*Example 2*

A culture medium was prepared as follows:

| | | |
|---|---|---|
| Corn steep solids | pounds | 500 |
| Corn sugar | do | 125 |
| Lactose | do | 500 |
| Calcium carbonate | do | 50 |
| Zinc sulfate heptahydrate | do | 1.0 |
| Water | gallons | 3,000 |

Addition of about 4 pounds of N-(2,2-diethoxyethyl)-phenylacetamide equivalent on a weight-volume basis to 0.02 percent, inoculation of the culture medium with a Penicillium mold strain N. R. R. L. 1976 and growth of the mold for 4 days at 27° C. produces a concentration of penicillin greater by 20 percent or more than is produced in the above culture medium under the same conditions of growth but in the absence of N-(2,2-diethoxyethyl)-phenylacetamide.

In the above examples "corn steep solids" has been included as a constituent of the culture medium. Corn steep solids assists in the obtaining of high yields of penicillin but due in part to the heterogeneous nature of the corn steep solids, difficulty is involved in the separation of penicillin from other constituents of the culture medium following the growth of the mold.

In the following examples the culture medium does not contain corn steep solids and is of more precise chemical composition. The employment of such culture medium may result in the production of a lower yield of penicillin. On the other hand, penicillin which is produced may be considerably more readily separated from the culture medium following the growth of the mold.

*Example 3*

A culture medium not embodying corn steep solids is as follows:

| | |
|---|---|
| Potassium dihydrogen phosphate ____ g__ | 1.0 |
| Dipotassium hydrogen phosphate ____ g__ | 1.0 |
| Magnesium sulfate heptahydrate ____ g__ | 1.0 |
| Sodium nitrate ____ g__ | 2.0 |
| Lactose ____ g__ | 10.0 |
| Zinc sulfate heptahydrate ____ g__ | 0.01 |
| Water, q. s ____ cc__ | 2,000 |

(Adjusted to pH 6.5 with NaOH solution)

N-(2,2-diethoxyethyl)-phenylacetamide was incorporated in the above culture medium to the extent of 0.02 percent and the medium inoculated with a Penicillium mold, strain N. R. R. L. 1976. The culture was mechanically agitated for 3 days and maintained at a temperature of about 27° C. Penicillin was then found to be present to the extent of 35 Oxford units per cc. of culture medium.

By way of comparison, under the same conditions except for the absence of N-(2,2-diethoxyethyl)-phenylacetamide, the penicillin production was only 27 Oxford units per cc. of culture medium.

*Example 4*

Another example of a culture medium not embodying corn steep solids is as follows:

| | |
|---|---|
| Water ____ cc__ | 1,000 |
| Lactose ____ g__ | 25.0 |
| Dextrose ____ g__ | 5.0 |
| Sodium nitrate ____ g__ | 5.0 |
| Ammonium nitrate ____ g__ | 5.0 |
| Potassium dihydrogen phosphate ____ g__ | 1.0 |
| Magnesium sulfate ____ g__ | 0.25 |
| Acetic acid ____ g__ | 5.0 |

A culture medium of the above composition wherein is incorporated 0.02 percent of N-(2,2-diethoxyethyl)-phenylacetamide on a weight-volume basis when inoculated with the Penicillium mold, strain N. R. R. L. 1976, mechanically agitated and maintained at a temperature of about 27° C. for 6 days, produces a concentration of penicillin greater by 20 percent or more than is produced under the same conditions in the above culture medium but in the absence of N-(2,2-diethoxyethyl)-phenylacetamide.

For purposes of convenience a method of preparation of N-(2,2-diethoxyethyl)-phenylacetamide useful in carrying out this invention is given below.

10 g. of aminodiethylacetal are suspended in 150 cc. of 4 percent sodium hydroxide solution and 15 g. of phenylacetyl chloride are added thereto in small portions, and with shaking. After all of the phenylacetyl chloride is added, the reaction mixture is allowed to stand about ½ hour and is then filtered to remove the N-(2,2-diethoxyethyl)-phenylacetamide which separates as a solid. The N-(2,2-diethoxyethyl)-phenylacetamide after it is washed several times with cold water to remove any unreacted material and dried, melts at about 37° C.

What is claimed is:

1. The method of producing penicillin in submerged culture which comprises growing a Penicillium mold of the notatum-chrysogenum group in a culture medium in the presence of an effective amount less than about one percent of N-(2,2-diethoxyethyl)-phenylacetamide represented by the formula

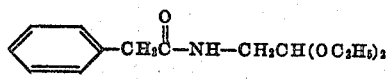

2. The improved method of obtaining penicillin in submerged culture which which comprises providing an aqueous culture medium for the growth and development of a Penicillium mold of the notatum-chrysogenum group, associating with said culture medium a Penicillium mold of the notatum-chrysogenum group and an effective amount less than about one percent of N-(2,2-diethoxyethyl)-phenylacetamide represented by the formula

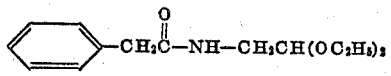

3. In the method of producing penicillin in submerged culture by growing a Penicillium mold of the notatum-chrysogenum group in association with a nutrient material, the improvement which comprises incorporating in the nutrient material, in effective amount less than about 1 percent, N-(2,2-diethoxyethyl)-phenylacetamide represented by the formula

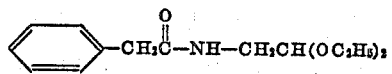

4. The improved method of producing penicillin in submerged culture which comprises providing a culture medium containing a nutrient material, and associating with said culture medium a Penicillium mold of the notatum-chrysogenum group and about 0.02 percent of N-(2,2-diethoxyethyl)-phenylacetamide represented by the formula

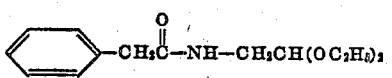

5. A culture medium for the production of penicillin in submerged culture through the growth of a Penicillium mold of the notatum-chrysogenum group, said culture medium comprising nutrient material and an effective amount less than about one percent of N-(2,2-diethoxyethyl)-phenylacetamide represented by the formula

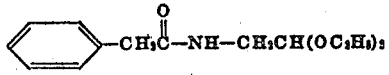

6. A culture medium for the production of penicillin in submerged culture through the growth of a Penicillium mold of the notatum-chrysogenum group, said culture medium comprising water, nutrient material and, in amount effective to accelerate the production of penicillin and less than about 1 percent, N-(2,2-diethoxyethyl)-phenylacetamide represented by the formula

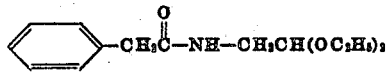

7. A culture medium for the production of penicillin in submerged culture through the growth of a Penicillium mold of the notatum-chrysogenum group, said culture medium comprising water, nutrient material dispersed in said water, and about 0.02 percent of N-(2,2-diethoxyethyl)-phenylacetamide represented by the formula

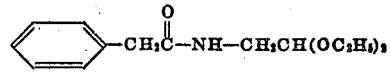

OTTO K. BEHRENS.
REUBEN G. JONES.
QUENTIN F. SOPER.

REFERENCES CITED

The following references are of record in the file of this patent:

Coghill, Monthly Progress Report No. 16, Nov. 20, 1943. Distributed by Committee on Medical Research, O. S. R. D., pages 1 and 2.

Pennsylvania State College, Penicillin Interim Report (45–124), March 30, 1945, page 1.